United States Patent
Hashimoto et al.

(10) Patent No.: US 10,250,037 B2
(45) Date of Patent: Apr. 2, 2019

(54) HARMONIC CURRENT COMPENSATOR AND AIR-CONDITIONING SYSTEM

(71) Applicant: Mitsubishi Electric Corporation, Tokyo (JP)

(72) Inventors: Akinori Hashimoto, Tokyo (JP); Shinsaku Kusube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 190 days.

(21) Appl. No.: 15/111,039

(22) PCT Filed: Mar. 31, 2014

(86) PCT No.: PCT/JP2014/059573
§ 371 (c)(1),
(2) Date: Jul. 12, 2016

(87) PCT Pub. No.: WO2015/151205
PCT Pub. Date: Oct. 8, 2015

(65) Prior Publication Data
US 2016/0344185 A1    Nov. 24, 2016

(51) Int. Cl.
*H02J 1/02*     (2006.01)
*H02J 3/01*     (2006.01)
*F25B 49/02*    (2006.01)

(52) U.S. Cl.
CPC .............. *H02J 3/01* (2013.01); *F25B 49/025* (2013.01); *F25B 2500/15* (2013.01); *F25B 2500/27* (2013.01); *Y02E 40/40* (2013.01)

(58) Field of Classification Search
CPC ........... H02J 3/01; H02J 3/1842; Y02E 40/22; Y02E 40/40
See application file for complete search history.

(56) References Cited

U.S. PATENT DOCUMENTS

| 5,138,247 A | 8/1992 | Tanoue et al. |
| 5,977,660 A | 11/1999 | Mandalakas et al. |

(Continued)

FOREIGN PATENT DOCUMENTS

| CN | 1070774 A | 4/1993 |
| JP | H02-129142 U | 10/1990 |

(Continued)

OTHER PUBLICATIONS

Office Action dated Dec. 19, 2017 issued in corresponding CN patent application No. 201480073438.0 (and English translation attached).

(Continued)

*Primary Examiner* — Sibin Chen
(74) *Attorney, Agent, or Firm* — Posz Law Group, PLC

(57) ABSTRACT

A harmonic current compensator is connected in parallel with a harmonic generating load to a system power supply and supplies a compensation current Ia to limit a harmonic component contained in a load current IL to be input from the system power supply to the harmonic generating load. The harmonic current compensator includes: a load current detector that detects the load current IL; a compensation current detector that detects the supplied compensation current Ia; a control amount computing portion that computes a control amount of the compensation current Ia based on the harmonic component contained in the load current IL detected by the load current detector and the compensation current Ia detected by the compensation current detector; and a limiter that limits an upper limit of the compensation current Ia.

7 Claims, 10 Drawing Sheets

(56) References Cited

U.S. PATENT DOCUMENTS

| | | | |
|---|---|---|---|
| 2013/0128632 A1* | 5/2013 | Yang | H02M 5/458 363/37 |
| 2016/0070241 A1* | 3/2016 | Kawashima | H02M 7/48 700/41 |

FOREIGN PATENT DOCUMENTS

| | | |
|---|---|---|
| JP | H06-029766 A | 2/1994 |
| JP | H06-113460 A | 4/1994 |
| JP | H08-503117 A | 4/1996 |
| JP | H09-065588 A | 3/1997 |
| JP | H09-200956 A | 7/1997 |
| JP | 2001-186752 A | 7/2001 |
| JP | 2008-104258 A | 5/2008 |
| JP | 2011-035986 A | 2/2011 |

OTHER PUBLICATIONS

International Search Report of the International Searching Authority dated Jun. 24, 2014 for the corresponding international application No. PCT/JP2014/059573 (and English translation).

Office Action dated Oct. 11, 2016 issued in corresponding JP patent application No. 2016-511225 (and English translation).

EESR dated Oct. 20, 2017 issued in corresponding EP patent application No. 14888041.2.

* cited by examiner

HARMONIC CURRENT COMPENSATOR AND AIR-CONDITIONING SYSTEM

CROSS REFERENCE TO RELATED APPLICATION

This application is a U.S. national stage application of PCT/JP2014/059573 filed on Mar. 31, 2014, the contents of which are incorporated herein by reference.

TECHNICAL FIELD

The present invention relates to a harmonic current compensator and an air-conditioning system.

BACKGROUND ART

A conventional harmonic current compensator is connected in parallel with a harmonic generating load to a system power supply. The conventional harmonic current compensator detects a load current input to the harmonic generating load and extracts a harmonic component contained in the detected load current. The conventional harmonic current compensator generates a compensation current for compensating for the extracted harmonic component by controlling ON and OFF states of a switching device.

The conventional harmonic current compensator has a function of, when an instantaneous value of the compensation current reaches a predetermined value or greater, determining that excess current (hereinafter referred to as an overcurrent) flows and coming into a stopped state.

Examples of the conventional harmonic current compensator include a harmonic current compensator that addresses harmonics without impairing harmonic compensation, by limiting a compensation instruction for reactive power of a fundamental wave when an instantaneous value of a compensation current is a predetermined value or greater (see, for example, Patent Literature 1).

CITATION LIST

Patent Literature

Patent Literature 1: Japanese Unexamined Patent Application Publication No. 06-113460 (paragraph [0011])

SUMMARY OF INVENTION

Technical Problem

With a system power supply having unbalanced interphase voltages or a large voltage distortion, however, an instantaneous value of a load current to be input to a harmonic generating load shows a large change at a phase in one cycle of the system power supply. In this case, to cope with a load current showing a large amount of change, a conventional harmonic current compensator instantaneously increases, a compensation current particularly in a period determined in a range determined in advance with reference to each phase showing a large change of an instantaneous value of a load current. Thus, the conventional harmonic current compensator might stop an operation of an air-conditioning apparatus by causing the compensation current to instantaneously reach the overcurrent level.

In the case of stopping an operation of the air-conditioning apparatus by causing the compensation current to instantaneously reach the overcurrent level, the conventional harmonic current compensator frequently starts and stops the air-conditioning apparatus consequently. Thus, in this case, the air-conditioning apparatus repeatedly starts and stops an air-conditioning operation such as cooling or heating and therefore the air-conditioning apparatus might fall short of capacity as a whole.

In other words, in the case where the instantaneous value of the load current greatly changes in the conventional harmonic current compensator under the influence of the system power supply, an operation of the air-conditioning apparatus stops disadvantageously because the compensation current instantaneously reaches the overcurrent level.

The present invention has been made to overcome problems as described above, and has an object of providing a harmonic current compensator and an air-conditioning system that can continue an operation of an air-conditioning apparatus without causing a compensation current to instantaneously reach an overcurrent level even when an instantaneous value of a load current greatly changes under the influence of a system power supply.

Solution to Problem

A harmonic current compensator according to an aspect of the present invention is a harmonic current compensator connected in parallel with a load to a system power supply and configured to supply a compensation current to limit a harmonic component contained in a load current to be input from the system power supply to the load, the harmonic current compensator comprising: a load current detection portion configured to detect the load current; a compensation current detection portion configured to detect the supplied compensation current; a control amount computing portion configured to compute a control amount of the compensation current based on the harmonic component contained in the load current detected by the load current detection portion and the compensation current detected by the compensation current detection portion; and a limiter configured to limit an upper limit of the compensation current.

Advantageous Effects of Invention

According to an aspect of the present invention, the upper limit of the compensation current is limited. Thus, even when an instantaneous value of the load current greatly changes under the influence of the system power supply, the compensation current does not instantaneously reach the overcurrent level and an operation of an air-conditioning apparatus can be continued. As a result, an aspect of the present invention provides an advantage of maintaining a capacity of the air-conditioning apparatus.

DESCRIPTION OF EMBODIMENTS

Figure 1:
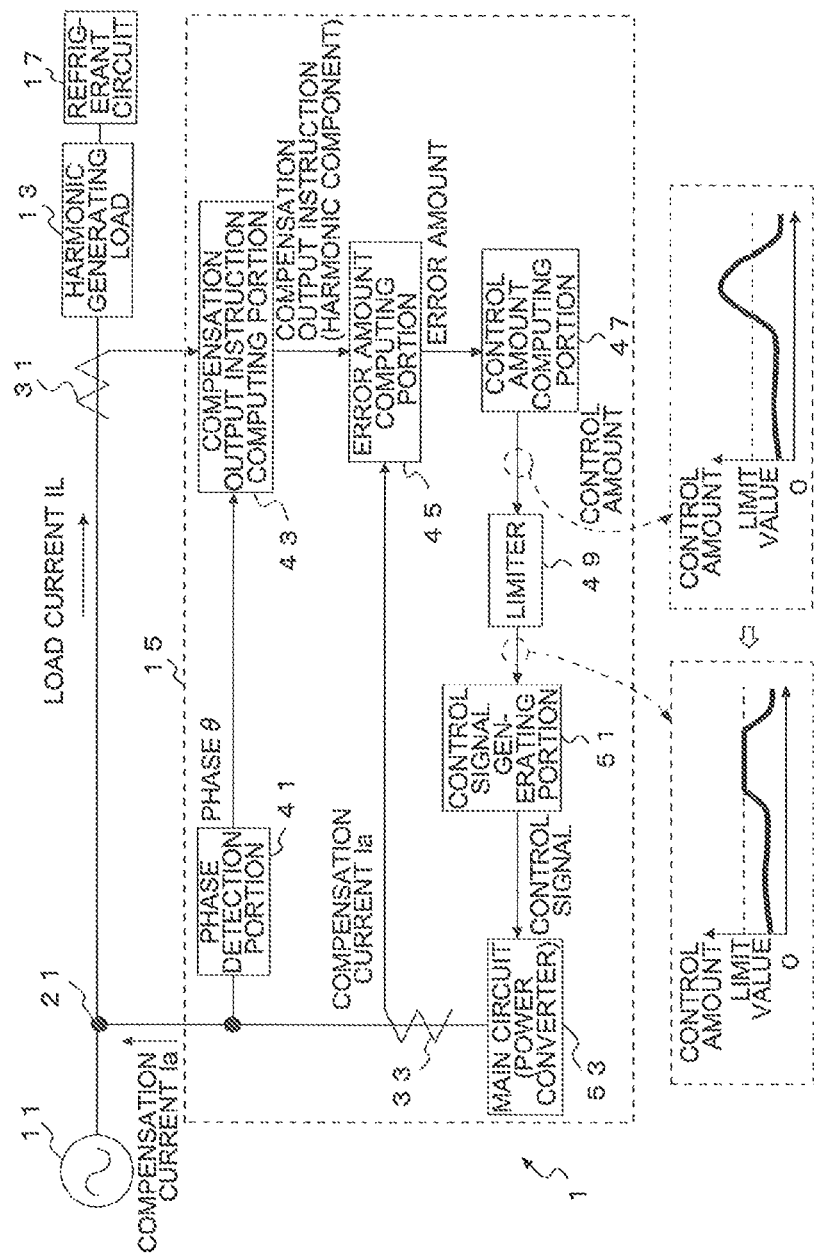
FIG. 1 schematically illustrates a configuration of an air-conditioning system 1 including a harmonic current compensator 15 according to Embodiment 1 of the present invention.

Embodiments of the present invention will be described hereinafter in detail with reference to the drawings. Steps describing a program for performing an operation according to Embodiments of the present invention are processes performed in time series in the order described herein, but may not be performed in time series, and may include processes that are performed in parallel or individually.

Functions described in Embodiments may be implemented by any of hardware or software. That is, the block diagrams described in Embodiments may be block diagrams of hardware or functional block diagrams of software. For example, the block diagrams may be implemented by hardware such as circuit devices or software executed on a computing device such as a processor (not illustrated).

The blocks of the block diagrams described in Embodiments only need to have their functions performed, and may be constituted by a superset, a subset, or a partially overlapping set of the blocks. In Embodiment 2, items that are not specifically described are common to those in Embodiment 1, and the same reference characters designate the same functions or configurations to be described. In Embodiment 3, items that are not specifically described are common to those in Embodiments 1 and 2, and the same reference characters designate the same functions or configurations to be described. In Embodiment 4, items that are not specifically described are common to those in Embodiments 1 through 3, and the same reference characters designate the same functions or configurations to be described.

Each of Embodiments 1 through 4 may be implemented alone or in any combination. In either case, advantages described later can be obtained. In each of Embodiments 1 through 4, only one specific example of the configuration is described. However, the present invention is not limited to these examples.

In Embodiments 1 through 4, a system refers to an entire apparatus constituted by a plurality of devices. In Embodiments 1 through 4, a network refers to a structure in which at least two devices are connected to each other and information is transmitted from one of the devices to other ones. Devices that communicate with each other through the network may be independently provided devices or may be internal blocks constituting one device. In Embodiments 1 through 4, communication may include a combination of wireless communication and wired communication as well as wireless communication or wired communication. For example, wireless communication may be performed in one section and wired communication may be performed in another section. Communication from one device to another device may be performed by wires and communication from the other device to the one device may be performed wirelessly.

Embodiment 1

Configuration According to Embodiment 1

FIG. 1 schematically illustrates a configuration of an air-conditioning system 1 including a harmonic current compensator 15 according to embodiment 1 of the present invention. In the air-conditioning system 1, for example, the harmonic current compensator 15 limits a harmonic component of a current flowing from a system power supply 11 such as an alternating current (AC) power supply and thereby compensates for a load current IL.

As illustrated in FIG. 1, the air-conditioning system 1 includes a system power supply 11, a harmonic generating load 13, the harmonic current compensator 15, and a refrigerant circuit 17, for example. The system power supply 11 is, for example, a three-phase alternating current power supply and supplies electric power. The harmonic generating load 13 is connected to the system power supply 11. Thus, the system power supply 11 supplies a current to the harmonic generating load 13.

The harmonic generating load 13 is, for example, a power converter, includes, for example, a rectifier, a direct-current (DC) reactor, and a smoothing capacitor (all not shown), converts an AC to a DC, and converts the DC to an AC based on a PWM signal, and supplies the resulting AC to the refrigerant circuit 17. The power converter generates a harmonic in, for example, converting an AC to a DC. The refrigerant circuit 17 is configured by, for example, connecting a compressor, a heat-source side heat exchanger, an expansion device, a four-way valve, a load side heat exchanger, and other components (all not shown) with refrigerant pipes. The compressor compresses a refrigerant and discharges the compressed refrigerant, and the refrigerant circulates in the refrigerant pipes, thereby forming a refrigeration cycle.

The harmonic current compensator 15 is connected in parallel to the harmonic generating load 13 at a point between the system power supply 11 and the harmonic generating load 13. The harmonic current compensator 15 reduces a harmonic generated by the harmonic generating load 13. For example, the harmonic current compensator 15 causes a load current detector 31 disposed between the system power supply 11 and the harmonic generating load 13 to detect a load current IL to be input to the harmonic generating load 13. Based on the detected load current IL, the harmonic current compensator 15 supplies a compensation current Ia to a power receiving point 21 disposed between the system power supply 11 and the harmonic generating load 13 and compensates for the load current IL. The load current detector 31 only needs to be a current sensor such as a current transformer (CT). However, the present invention is not limited to this example. For example, the load current detector 31 may be a shunt resistor. Although not shown, as a premise of a process performed by the harmonic current compensator 15, it is assumed that the load current detector 31 is provided for each phase. Specifically, although the following description of the process is directed to a representative phase, such as an R phase, similar processes are assumed to be performed for an S phase and a T phase.

A cause of generation of a harmonic is not limited to the harmonic generating load 13. For example, in a case where a lightning surge, for example, enters the system power supply 11 or other components, a harmonic component of the lightning surge is superimposed on the load current IL. In the case where the lightning surge, for example, enters the system power supply 11 or other components, the harmonic current compensator 15 also compensates for the load current IL by the following operation.

Figure 2:
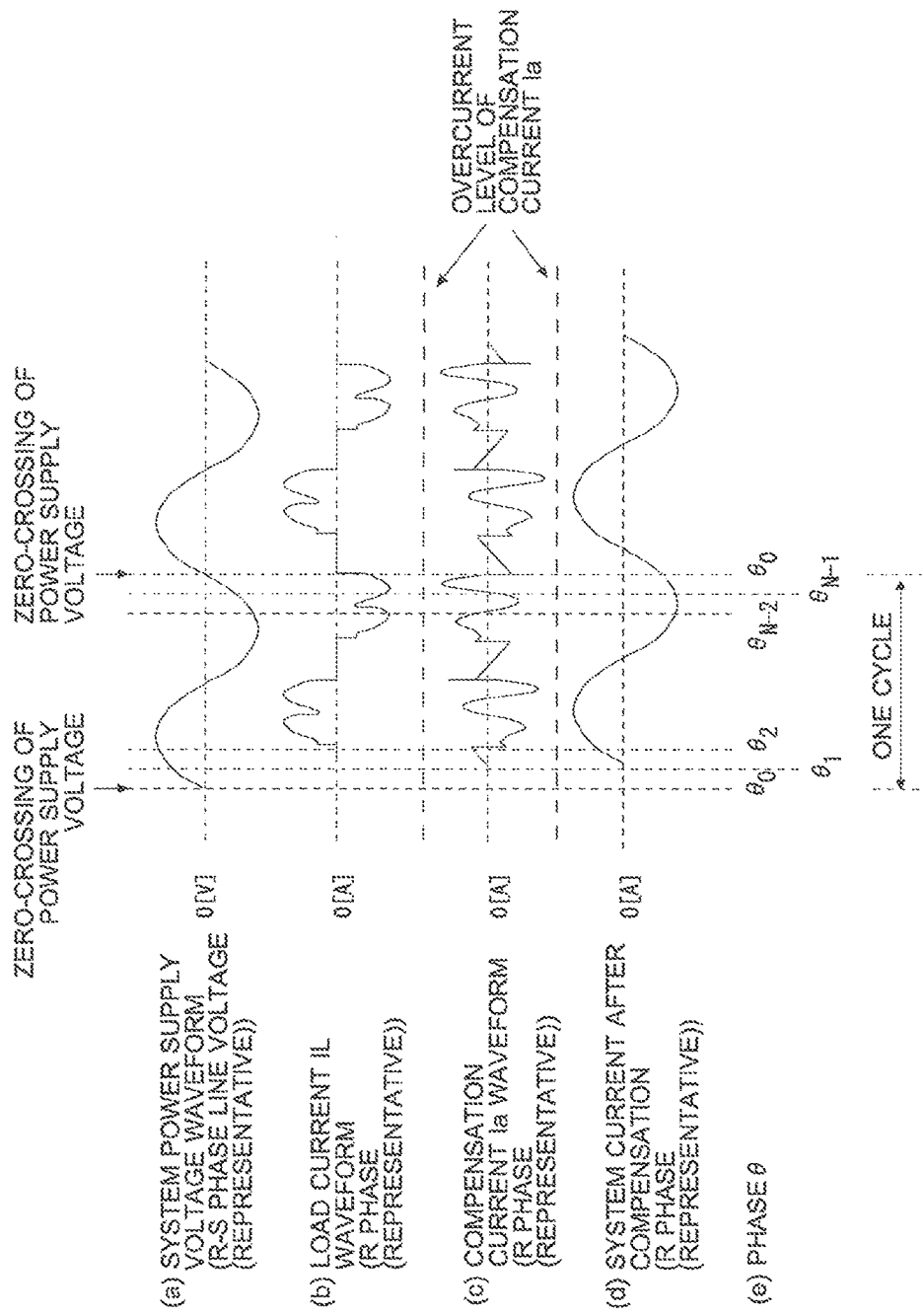
FIG. 2 shows examples of operation waveforms for describing harmonic compensation control in Embodiment 1 of the present invention.

Then, the harmonic current compensator 15 will be described in detail with reference to FIGS. 1 and 2. FIG. 2 shows examples of operation waveforms for describing harmonic compensation control in Embodiment 1 of the present invention. A phase shift of a current waveform herein is an example, and ideally is not present.

As illustrated in FIG. 1, the harmonic current compensator 15 includes, for example, a compensation current detector 33, a phase detection portion 41, a compensation output instruction computing portion 43, an error amount computing portion 45, a control amount computing portion 47, a limiter 49, a control signal generating portion 51, and a main circuit 53.

The compensation current detector 33 is provided at an output side of the main circuit 53, detects a compensation current Ia that is a compensation output from the main circuit 53, and supplies a detection result to the error amount computing portion 45. The compensation current detector 33 only needs to be a current sensor such as a current transformer (CT). However, the present invention is not limited to this example. Although not shown, as a premise of a process performed by the harmonic current compensator 15, it is assumed that the compensation current detector 33 is provided for each phase.

For example, the compensation current detector 33 may be a shunt resistor. The phase detection portion 41 detects a phase of a power supply voltage of the system power supply 11. The phase detection portion 41 includes, for example, a zero-crossing detection circuit. The zero-crossing detection circuit detects a zero point of a power supply voltage of the system power supply 11, and obtains a phase $\theta$ of the power supply voltage from the zero point of the power supply voltage of the system power supply 11 by computation. For example, as illustrated in FIG. 2, suppose a phase corresponding to the zero point of the power supply voltage is $\theta_0$, and then $\theta_1, \theta_2, \ldots,$ and $\theta_{N-1}$ are provided in each control period, and N control points are provided in one cycle of the power supply.

That is, the phase detection portion 41 obtains values of phases $\theta_0$ to $\theta_{N-1}$ for each control period and thereby a phase $\theta$ corresponding to the control point is obtained. The phase detection portion 41 supplies the obtained phase $\theta$ to the compensation output instruction computing portion 43. The control period is assumed to be the same as a carrier period in this example, but may be different from the carrier period. Here, the carrier period is assumed to be a period in which ON and OFF states of a switching device provided in the main circuit 53 are controlled. That is, the carrier herein refers to a carrier signal, and is a reference carrier wave for use in generation of a PWM signal. The carrier signal is, for example, a triangular wave. However, the present invention is not limited to this, and the carrier signal may be a sawtooth wave that tilts in a positive or negative direction.

The compensation output instruction computing portion 43 obtains a harmonic component contained in a load current IL supplied from the load current detector 31 and supplies a signal corresponding to the obtained harmonic component as a compensation output instruction to the error amount computing portion 45, for each control period, for example. The compensation output instruction computing portion 43 comprises, for example, a band-pass filter, and extracts a harmonic component in a predetermined frequency range. However, the present invention is not limited to this example.

For example, the compensation output instruction computing portion 43 may be a high-pass filter to extract a harmonic component with a predetermined frequency or more. For example, the compensation output instruction computing portion 43 may perform Fourier transform on the load current IL supplied from the load current detector 31 to extract a predetermined frequency component and perform inverse Fourier transform on a signal including the extracted frequency component.

That is, as long as the compensation output instruction computing portion 43 removes a fundamental wave component from the load current IL supplied from the load current detector 31 and extracts a harmonic component contained in the load current IL supplied from the load current detector 31, the configuration in mounting the compensation output instruction computing portion 43 is not specifically limited.

Based on a compensation output instruction supplied from the compensation output instruction computing portion 43 and a compensation current Ia supplied from the compensation current detector 33, the error amount computing portion 45 obtains the error amount occurring between the compensation output instruction and the compensation current Ia, and supplies the obtained error amount to the control amount computing portion 47. Based on the error amount supplied from the error amount computing portion 45, the control amount computing portion 47 obtains a control amount and supplies the control amount to the limiter 49.

The limiter 49 limits the control amount supplied from the control amount computing portion 47, and supplies a result of the limiting to the control signal generating portion 51. The limiter 49 limits the control amount such that the compensation current Ia does not exceed an overcurrent level of the compensation current Ia. The overcurrent level herein refers to an upper limit and a lower limit of the compensation current Ia as illustrated in FIG. 2, for example. That is, the upper limit of an absolute value of an amplitude of the compensation current Ia is set as the overcurrent level. If the compensation current Ia exceeds the overcurrent level, the harmonic generating load 13 stops an operation thereof to avoid damage such as breakdown of an electric circuit. Since the compensation current Ia is an alternating current, the limiter 49 limits both the positive and negative sides of the compensation current Ia. In a case where the compensation current Ia that is a result of detection of the compensation current detector 33 is positive, the limiter 49 limits only the positive side. In a case where the compensation current Ia that is a result of detection of the compensation current detector 33 is negative, the limiter 49 limits only the negative side.

For example, suppose the compensation current Ia is larger than that of the compensation output instruction. In this case, as described above, the limiter 49 limits only the positive side in a case where the compensation current Ia is positive. Consequently, control for limiting the compensation current Ia itself is not limited, and thus, occurrence of an overcurrent due to a failure in limiting the compensation current Ia can be avoided.

In a case where a control amount is supplied from the error amount computing portion 45, for example, the limiter 49 performs an operation as described above and supplies a control amount with which the compensation current Ia does not exceed an overcurrent level of the compensation current Ia to the control signal generating portion 51. Based on the control amount supplied from the limiter 49, the control signal generating portion 51 generates a control signal. The supply of the control amount output from the control amount computing portion 47 to the control signal generating portion 51 through the limiter 49 consequently leads to an operation of reducing a period corresponding to the ON state of the switching device and an operation of increasing a period corresponding to the OFF state of the switching device.

The limiter 49 limits the control amount to a preset value, such as the limit value described above. The preset value herein may be a value that is experimentally determined such that the compensation current Ia does not reach the overcurrent level even in a case where interphase voltages become unbalanced or a voltage distortion occurs under overload operation conditions. As the preset value, a current value of the compensation current Ia is determined such that the capacity of limiting a harmonic component of the load current IL is not affected even if the unbalanced state of the interphase voltage or the voltage distortion is within an expected range. That is, as long as the control amount of the compensation current Ia is the preset value or less, compensation current Ia generated based on the control amount of the compensation current Ia is at the overcurrent level or less and an amplitude value with which the harmonic component of the load current IL is limited is satisfied.

Specifically, the control signal generating portion 51 generates a control signal based on the control amount supplied from the limiter 49 and the carrier period, and supplies the generated control signal to the main circuit 53. The control signal generating portion 51, for example, calculates a duty ratio based on the control amount supplied from the limiter 49, and generates a control signal, such as a PWM signal, based on the calculated duty ratio and the carrier period.

The main circuit 53 has a typical circuit configuration, and includes, for example, a gate driving circuit, a bridge circuit constituted by six arms including pairs of switching devices and free-wheel diodes, three reactors each connected to a midpoint between one of three upper arms and a corresponding one of three lower arms in the six arms of the bridge circuit, and a capacitor for energy storage provided in a DC part of the bridge circuit (all not shown).

Based on the control signal supplied from the control signal generating portion 51, the main circuit 53 generates a compensation current Ia and supplies generated compensation current Ia to the power receiving point 21. As a result, the harmonic component of the load current IL is limited and thus compensation is performed such that a current including a harmonic component does not flow into the system power supply 11. A system current after the compensation at this time has a current waveform as illustrated in FIG. 2, for example. Specifically, the compensation current Ia not exceeding an overcurrent level as illustrated in FIG. 2 is supplied to the power receiving point 21 and accordingly a distortion component caused by a harmonic component contained in the load current IL is limited. As a result, a system current with a limited distortion component is supplied to the harmonic generating load 13.

Thus, the harmonic current compensator 15 has an operation configuration for controlling a future compensation current Ia based on a past compensation current Ia to limit a control amount of a next compensation current Ia by comparing a control amount of a previously supplied compensation current Ia and a preset value. That is, in the harmonic current compensator 15, although a compensation operation for the load current IL delays by a period corresponding to one cycle of a control period, if a carrier frequency is set as a high-speed value and ON and OFF states of the switching device are controlled at high speed by using a high-speed switching device, a harmonic component of the load current IL can be limited to a negligible level in practical use.

Even in the presence of a delay component corresponding to one cycle of a control period, a next load current IL can be predicted as long as the harmonic generating load 13, for example, does not abruptly change and the load current IL is periodic. Thus, in such a case where a load current IL can be predicted, even in the presence of a delay component corresponding to one cycle of a control period, the harmonic current compensator 15 can further improve a compensation operation by performing feedforward control on a control system.

A specific example will be described. The compensation output instruction computing portion 43 supplies a signal including information of 5 A, for example, as a compensation output instruction to the error amount computing portion 45. The compensation current detector 33 supplies a signal including information of 4 A, for example, as a compensation current Ia to the error amount computing portion 45. In this case, the error amount computing portion 45 computes 1 A as the error amount, and supplies a signal including information of 1 A to the control amount computing portion 47. To eliminate the error of 1 A, that is, to increase the compensation current Ia by 1 A, the control amount computing portion 47 computes a control amount corresponding to 1 A. The control amount computing portion 47 performs computation such as P control, I control, and PI control.

A specific example of the error amount will now be described. When a load current IL abruptly changes, the error amount increases. For example, this example is on the assumption that a compensation output instruction abruptly changes from 5 A to 15 A, that is, a compensation current Ia is controlled to approach a compensation output instruction 5 A and the instruction abruptly changes immediately after the compensation current Ia actually becomes 5 A. In this assumption, the compensation output instruction computing portion 43 supplies a signal including information of 15 A as a compensation output instruction to the error amount computing portion 45. The compensation current detector 33 supplies a signal including 5 A as a compensation current Ia to the error amount computing portion 45. In this case, the error amount computing portion 45 computes 10 A as the error amount, and supplies a signal including information of 10 A to the control amount computing portion 47. To eliminate the error of 10 A, that is, to increase the compensation current Ia by 10 A, the control amount computing portion 47 computes a control amount corresponding to 10 A.

As described above, as the error amount increases, an output from the main circuit 53 increases, and when the output from the main circuit 53 becomes excessively high, the compensation current Ia reaches an overcurrent level. That is, in a case where the compensation current Ia abruptly changes, the error amount increases. Thus, to reduce such a large error amount to 0 (zero), the output from the main circuit 53 becomes excessively high. For example, as described above, suppose the compensation output instruction is 15 A and a detection value that is a detection result of the compensation current detector 33 is 5 A, the main circuit 53 tries to produce an output corresponding to the error amount of 10 A. In view of this, the harmonic current compensator 15 limits a control amount not to operate in the presence of a predetermined error amount or more.

In other words, as the error amount increases, the control amount increases. When the control amount becomes a predetermined level or more, a compensation current Ia that is a detection result of the compensation current detector 33 at this time is excessively large. In view of this, as described above, the limiter 49 sets a limit value at a level at which the compensation current Ia is not excessively large. As a result, in a case where the control amount exceeds the limit value, the limiter 49 limits the control amount to the limit value. A specific example of an operation will now be described with reference to FIG. 3.

Operation of Embodiment 1

Figure 3:
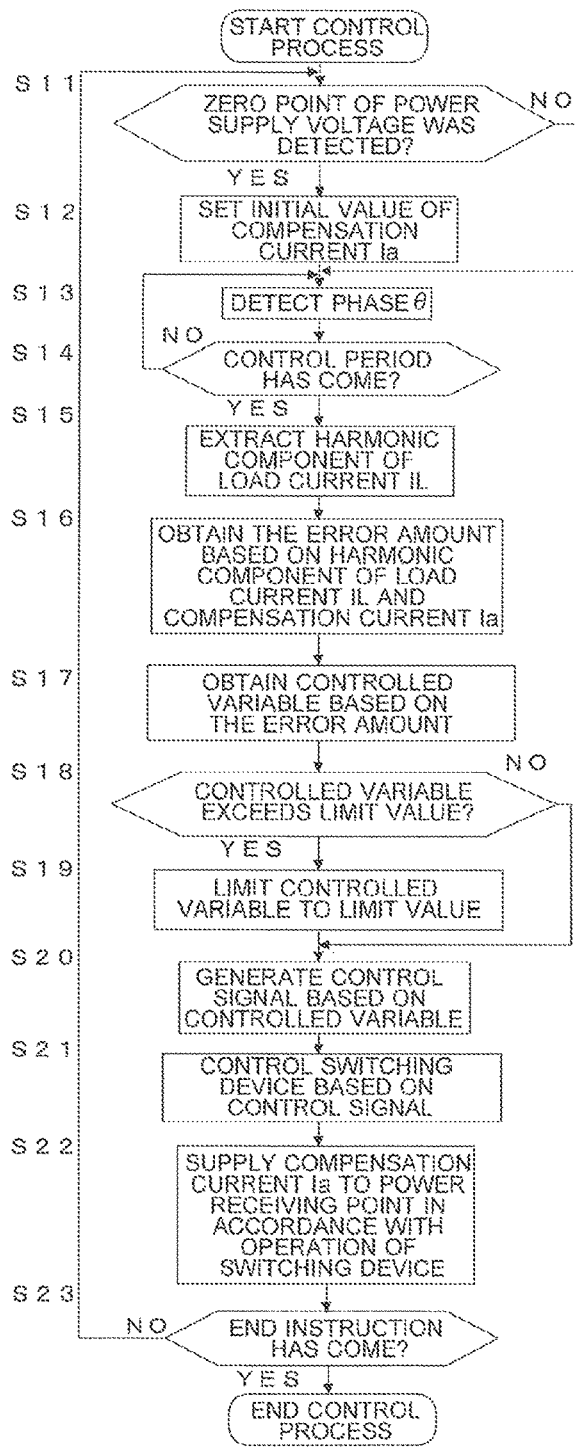
FIG. 3 is a flowchart of a control example of the harmonic current compensator 15 in Embodiment 1 of the present invention.

FIG. 3 is a flowchart of a control example of the harmonic current compensator 15 in Embodiment 1 of the present invention. The harmonic current compensator 15 does not determine, as control, whether the compensation current Ia exceeds the overcurrent level or not. In this example, it is assumed that it has been experimentally confirmed that when the control amount exceeds a predetermined value, the compensation current Ia reaches the overcurrent level. The harmonic current compensator 15 determines, in control, whether the control amount exceeds the predetermined value or not. If the control amount exceeds the predetermined value, the harmonic current compensator 15 limits the control amount to the predetermined value. A case where the predetermined value is assumed to be a limit value will be described later.

(Step S11)
The harmonic current compensator 15 determines whether a zero point of a power supply voltage is detected or not. If the zero point of the power supply voltage is detected, the harmonic current compensator 15 proceeds to step S12. If the zero point of the power supply voltage is not detected, the harmonic current compensator 15 proceeds to step S13.

(Step S12)
The harmonic current compensator 15 sets an initial value of a compensation current Ia.

(Step S13)
The harmonic current compensator 15 detects a phase θ.

(Step S14)
The harmonic current compensator 15 determines whether a control period comes or not. If the control period comes, the harmonic current compensator 15 proceeds to step S15. If the control period does not come, the harmonic current compensator 15 returns to step S13.

(Step S15)
The harmonic current compensator 15 extracts a harmonic component of a load current IL.

(Step S16)
Based on the harmonic component of the load current IL and the compensation current Ia, the harmonic current compensator 15 obtains the error amount.

(Step S17)
Based on the error amount, the harmonic current compensator 15 obtains a control amount.

(Step S18)
If the control amount exceeds a limit value, the harmonic current compensator 15 proceeds to step S19. If the control amount does not exceed the limit value, the harmonic current compensator 15 proceeds to step S20.

(Step S19)
The harmonic current compensator 15 limits the control amount to the limit value.

(Step S20)
Based on the control amount, the harmonic current compensator 15 generates a control signal.

(Step S21)
Based on the control signal, the harmonic current compensator 15 controls a switching device.

(Step S22)
In accordance with an operation of the switching device, the harmonic current compensator 15 supplies the compensation current Ia to the power receiving point 21.

(Step S23)
The harmonic current compensator 15 determines whether an end instruction has come or not. If the end instruction has come, the harmonic current compensator 15 finishes the process. If the end instruction has not come, the harmonic current compensator 15 returns to step S11.

Advantages of Embodiment 1

As described above, in the harmonic current compensator 15, the limiter 49 prevents the control amount from increasing to a predetermined value or more. Thus, in the harmonic current compensator 15, even in a case where the error amount between the compensation output instruction output from the compensation output instruction computing portion 43 and the compensation current Ia is large, that is, in a case where the amount of change of the compensation output instruction is increased with an increased change in the load current IL under the influence of, for example, the system power supply 11, the compensation current Ia does not increase along with a change in the load current IL. Thus, the compensation current Ia does not reach the overcurrent level and thus the harmonic current compensator 15 can continue an operation of the harmonic generating load 13.

That is, if the control amount exceeds a predetermined value, the harmonic current compensator 15 limits the control amount of the compensation current Ia and generates a compensation current Ia based on the limited control amount. Accordingly, the harmonic current compensator 15 limits the upper limit of the compensation current Ia, and even when the instantaneous value of the load current IL greatly changes under the influence of the system power supply 11, the compensation current Ia does not instantaneously reach the overcurrent level and the harmonic current compensator 15 can continue an operation of the harmonic generating load 13. Thus, for example, suppose the harmonic generating load 13 is a power converter and the power converter supplies electric power to the refrigerant circuit 17, an operation of the air-conditioning apparatus including the refrigerant circuit 17 can continue.

The foregoing description is directed to an example in which the compensation current Ia is used for compensating for a harmonic component contained in the load current IL to be input to the harmonic generating load 13. However, the present invention is not limited to this example. For example, a compensation voltage may be used for compensating for a harmonic component contained in a voltage to be input to the harmonic generating load 13.

As described above, in Embodiment 1, a harmonic current compensator 15 that is connected in parallel with a harmonic generating load 13 to a system power supply 11 and supplies a compensation current Ia to limit a harmonic component contained in a load current IL to be input from the system power supply 11 to the harmonic generating load 13, includes: a load current detector 31 that detects the load current IL; a compensation current detector 33 that detects the supplied compensation current Ia; a control amount computing portion 47 that computes a control amount of the compensation current Ia based on the harmonic component contained in the load current IL detected by the load current detector 31 and the compensation current Ia detected by the compensation current detector 33; and a limiter 49 that limits an upper limit of the compensation current Ia.

As described above, since the harmonic current compensator 15 limits the upper limit of the compensation current Ia, even when the instantaneous value of the load current IL greatly changes by being influenced by the system power supply 11, the compensation current Ia does not instantaneously reach the overcurrent level and the harmonic current compensator 15 can continue an operation of the air-conditioning apparatus. As a result, the harmonic current compensator 15 can maintain the capacity of the air-conditioning apparatus.

In Embodiment 1, in a case where the upper limit of the compensation current Ia is less than or equal to an overcurrent level for determining whether to stop an operation of the harmonic generating load 13 or not and the upper limit of the compensation current Ia exceeds the overcurrent level, the limiter 49 may limit the upper limit of the control amount of the compensation current Ia.

With the foregoing configuration, even in a case where the harmonic current compensator 15 controls the ON and OFF states of the switching device included in the main circuit 53 by using a control signal generated based on a limited control amount to limit the upper limit of the control amount of the compensation current Ia, the compensation current Ia output from the main circuit 53 does not exceed the overcurrent level. Thus, the harmonic current compensator 15 does not generate a compensation current Ia with a large amplitude that causes stopping of an operation of the air-conditioning apparatus, and thus, an operation of the air-conditioning apparatus can continue. As a result, the harmonic current compensator 15 can maintain particularly the capacity of the air-conditioning apparatus.

Embodiment 2

Difference from Embodiment 1

A harmonic current compensator 15 according to Embodiment 2 restricts a period during which a limiter 49 operates. The harmonic current compensator 15 according to Embodiment 2 will now be described.

Configuration According to Embodiment 2

Figure 4:
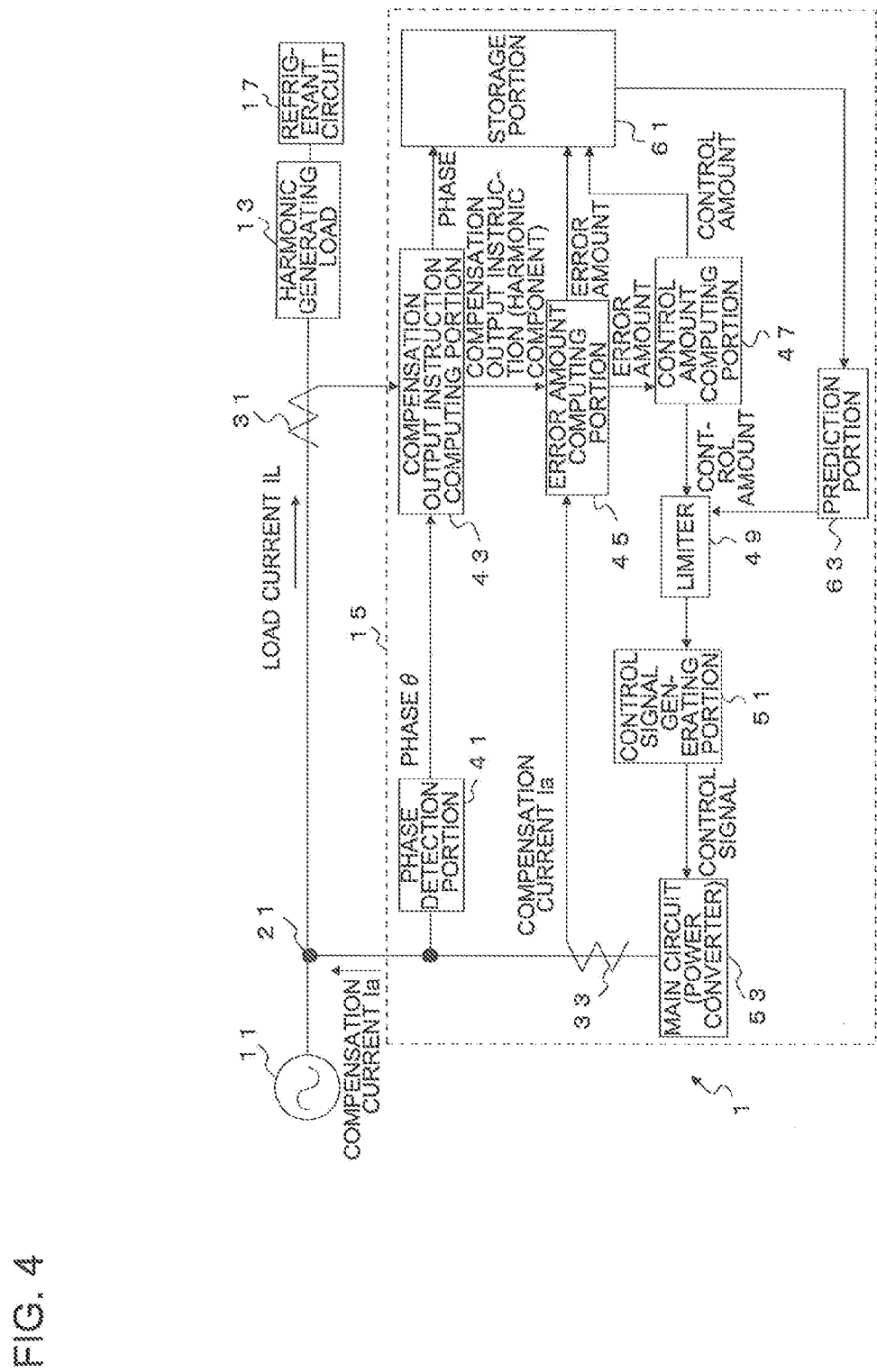
FIG. 4 schematically illustrates a configuration of an air-conditioning system 1 including a harmonic current compensator 15 according to Embodiment 2 of the present invention.
Figure 5:
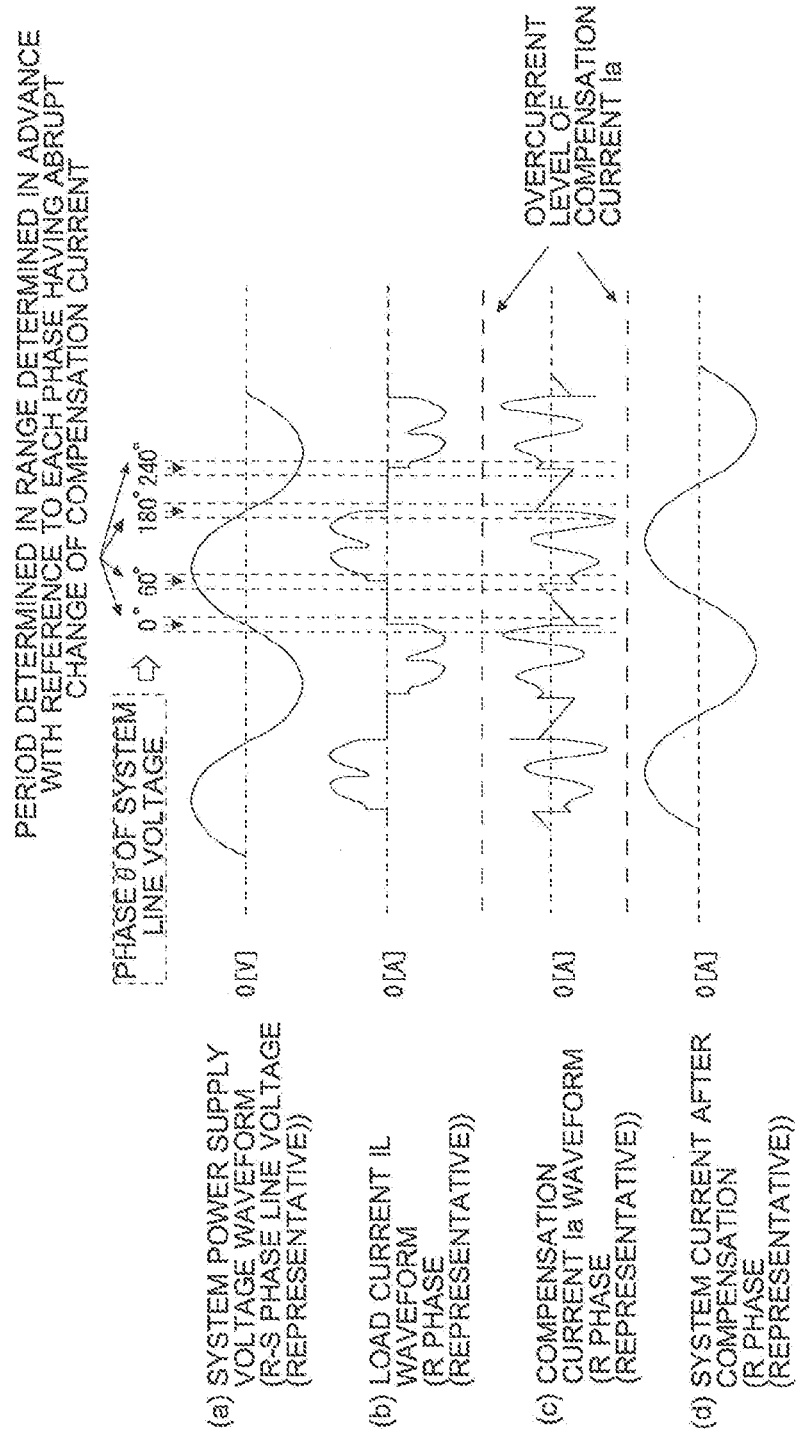
FIG. 5 shows examples of operation waveforms for describing harmonic compensation control in Embodiment 2 of the present invention.

FIG. 4 schematically illustrates a configuration of an air-conditioning system 1 including the harmonic current compensator 15 according to Embodiment 2 of the present invention. FIG. 5 shows examples of operation waveforms for describing harmonic compensation control in Embodiment 2 of the present invention.

As illustrated in FIG. 4, in addition to the configuration of the harmonic current compensator 15 according to Embodiment 1, the harmonic current compensator 15 according to Embodiment 2 additionally includes a storage portion 61 and a prediction portion 63. The storage portion 61 stores, for example, a phase θ detected for each control period, the error amount obtained for each control period, and a control amount obtained for each control period. Based on data on the past, the prediction portion 63 predicts a future control amount and specifies a period during which the limiter 49 operates.

Specifically, the prediction portion 63 determines in advance a period, that is, a phase, in which the amount of change of the compensation output instruction is supposed to be large in one cycle of the system power supply 11, and the limiter 49 limits the control amount only in the determined period. The period in which the amount of change of the compensation output instruction is supposed to be large herein is specifically a period determined by focusing on periodicity of the compensation current Ia, and is a period corresponding to a phase within a range determined in advance with reference to the timing at which a past control amount is larger than a preset value, that is, a reference phase, in one cycle of a power supply voltage of a system power supply 11. For example, suppose a phase of 60° is a reference phase and the predetermined range is shifted by 5° each before and after the reference phase, the corresponding period is a phase of 55° to 65°. In this case, the harmonic current compensator 15 limits a control amount of the compensation current Ia in a period corresponding to a phase of 55° to 65°.

That is, the prediction portion 63 predicts, as a period in which the amount of change of the compensation output instruction is supposed to be large, a period including periods as margins before and after a reference phase that is a phase in a case where the control amount of the compensation current Ia exceeds a preset value in control amounts of the compensation current Ia in one cycle of the system power supply 11.

As for determination of the timing, that is, the determination of a phase, the compensation output instruction computing portion 43 may predict based on the amount of change in a load current IL. As for determination of the phase, prediction may be performed based on the amount of variation in a power supply voltage waveform of the system power supply 11. The determination of the phase may be performed in a predetermined period that is experimentally determined. The limiting determination value may dynamically change based on a value detected in the past for each control period. For example, in a case where the harmonic generating load 13 is a three-phase bridge rectifying circuit incorporating a DC reactor, the load current IL is a square-wave current flowing only in a 120° zone obtained by sequentially dividing a DC pulsating current in three phases, that is, a current with a so-called distortion in a phase-bump state. Thus, in this case, a phase corresponding to a line voltage of the power supply voltage abruptly changes at 0°, 60°, 180°, and 240° as illustrated in FIG. 5, and thus, the harmonic current compensator 15 causes the limiter 49 to operate in accordance with the phase that abruptly changes.

Operation of Embodiment 2

Figure 6:
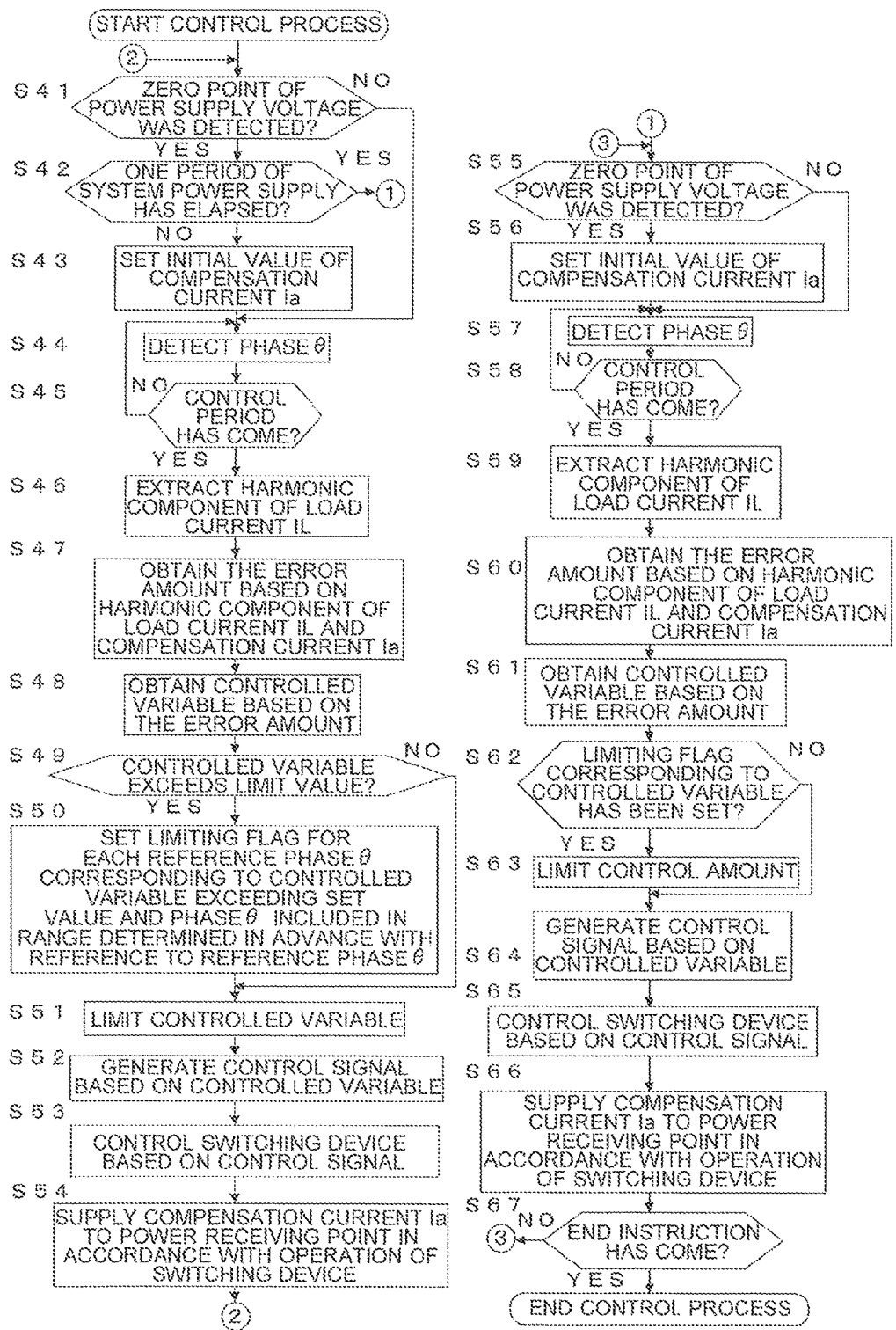
FIG. 6 is a flowchart of a control example of the harmonic current compensator 15 in Embodiment 2 of the present invention.

FIG. 6 is a flowchart of a control example of the harmonic current compensator 15 in Embodiment 2 of the present invention.

(Step S41)

The harmonic current compensator 15 determines whether a zero point of a power supply voltage was detected or not. If the zero point of the power supply voltage was detected, the harmonic current compensator 15 proceeds to step S42. If the zero point of the power supply voltage was not detected, the harmonic current compensator 15 proceeds to step S44.

(Step S42)

The harmonic current compensator 15 determines whether one cycle of the system power supply 11 has elapsed or not. If one cycle of the system power supply 11 has elapsed, the harmonic current compensator 15 proceeds to step S54. If one cycle of the system power supply 11 has not elapsed, the harmonic current compensator 15 proceeds to step S43.

(Step S43)

The harmonic current compensator 15 sets an initial value of a compensation current Ia.

(Step S44)

The harmonic current compensator 15 detects a phase θ.

(Step S45)

The harmonic current compensator 15 determines whether a control period has come or not. If the control period has come, the harmonic current compensator 15 proceeds to step S46. If the control period has not come, the harmonic current compensator 15 returns to step S44.

(Step S46)

The harmonic current compensator 15 extracts a harmonic component of a load current IL.

(Step S47)

Based on the harmonic component of the load current IL and the compensation current Ia, the harmonic current compensator 15 obtains the error amount.

(Step S48)

Based on the error amount, the harmonic current compensator 15 obtains a control amount.

(Step S49)

The harmonic current compensator 15 determines whether the control amount exceeds a set value or not. If the control amount exceeds the set value, the harmonic current compensator 15 proceeds to step S50. If the control amount does not exceed the set value, the harmonic current compensator 15 proceeds to step S51. The set value herein may be the limit value of the control amount described in Embodiment 1 or may be a limit value different among control amounts corresponding to phases included in a range determined in advance with reference to a reference phase.

(Step S50)

The harmonic current compensator 15 sets a limiting flag for each of the reference phase corresponding to a control amount exceeding the set value and a phase included in the range determined in advance with reference to the reference phase.

For example, it is assumed that the harmonic current compensator 15 limits a control amount of the compensation current Ia in a period corresponding to a phase of 55° to 65° and the control period is a phase of 1°. In such an assumption, a limiting flag of 1 is set for data corresponding to each of phases 55°, 56°, 57°, 58°, 59°, 60°, 61°, 62°, 63°, 64°, and 65° of the compensation current Ia. Such data may include a phase θ, an amplitude value, and a limiting flag relating to the compensation current Ia, for example.

(Step S51)

The harmonic current compensator 15 limits the control amount.

(Step S52)

Based on the control amount, the harmonic current compensator 15 generates a control signal.

(Step S53)

Based on the control signal, the harmonic current compensator 15 controls a switching device.

(Step S54)

In accordance with an operation of the switching device, the harmonic current compensator 15 supplies the compensation current Ia to the power receiving point 21.

(Step S55)

The harmonic current compensator 15 determines whether a zero point of a power supply voltage was detected or not. If the zero point of the power supply voltage was detected, the harmonic current compensator 15 proceeds to step S56. If the zero point of the power supply voltage was not detected, the harmonic current compensator 15 proceeds to step S57.

(Step S56)

The harmonic current compensator 15 sets an initial value of the compensation current Ia. For example, if the zero point of the power supply voltage is detected, the harmonic current compensator 15 proceeds to a new period of the power supply voltage in a next control period. Thus, on the assumption that there is no past data of the compensation current Ia corresponding to a new period of the power supply voltage, an initial value of the compensation current Ia is set.

(Step S57)

The harmonic current compensator 15 detects a phase θ.

(Step S58)

The harmonic current compensator 15 determines whether a control period has come or not. If the control period has come, the harmonic current compensator 15 proceeds to step S59. If the control period has not come, the harmonic current compensator 15 returns to step S57.

(Step S59)

The harmonic current compensator 15 extracts a harmonic component of the load current IL.

(Step S60)

Based on the harmonic component of the load current IL and the compensation current Ia, the harmonic current compensator 15 obtains the error amount.

(Step S61)

Based on the error amount, the harmonic current compensator 15 obtains a control amount.

(Step S62)

The harmonic current compensator 15 determines whether a limiting flag corresponding to a control amount is set or not. If the limiting flag corresponding to the control amount is set, the harmonic current compensator 15 proceeds to step S63. If the limiting flag corresponding to the control amount is not set, the harmonic current compensator 15 proceeds to step S64.

(Step S63)

The harmonic current compensator 15 limits the control amount. That is, in a period in which the limiting flag corresponding to the control amount is set, the harmonic current compensator 15 performs an operation of limiting the control amount.

(Step S64)

Based on the control amount, the harmonic current compensator 15 generates a control signal.

(Step S65)

Based on the control signal, the harmonic current compensator 15 controls a switching device.

(Step S66)

In accordance with an operation of the switching device, the harmonic current compensator 15 supplies the compensation current Ia to the power receiving point 21.

(Step S67)

The harmonic current compensator 15 determines whether an end instruction has come or not. If the end instruction has come, the harmonic current compensator 15 finishes the process. If the end instruction has not come, the harmonic current compensator 15 returns to step S55.

Advantages of Embodiment 2

As described above, the harmonic current compensator 15 according to Embodiment 2 restricts a period in which the control amount of the compensation current Ia is limited, that is, a phase for which the control amount of the compensation current Ia is limited. Thus, in the case of a phase for which the control amount of the compensation current Ia is not limited, the harmonic current compensator 15 cancels the harmonic component of the load current IL by using the compensation current Ia, whereas in the case of a phase for which the control amount of the compensation current Ia is limited, the harmonic current compensator 15 limits the load current IL by using the compensation current Ia. Accordingly, in a period except a period in which the control amount of the compensation current Ia is limited, the harmonic current compensator 15 does not perform an operation of limiting the control amount of the compensation current Ia, and thus, obtains a compensation amount of the load current IL substantially equal to that of a conventional device. In the period in which the control amount of the compensation current Ia is limited, the harmonic current compensator 15 can limit the harmonic component of the load current IL to some degree. Thus, the harmonic current compensator 15 can avoid stopping of an operation of the harmonic generating load 13 due to an excess of the compensation current Ia over the overcurrent level while limiting the harmonic component of the load current IL to some degree.

As described above, in Embodiment 2, the harmonic current compensator 15 may further include: a storage portion 61 that stores the compensation current Ia and a phase corresponding to the compensation current Ia; and a prediction portion 63 that predicts a phase at which the compensation current Ia exceeds a preset value, based on the compensation current Ia stored in the storage portion 61, and the limiter 49 may limit the control amount of the compensation current Ia corresponding to a phase in a range set in advance with reference to the phase predicted by the prediction portion 63.

With the configuration described above, the harmonic current compensator 15 restricts a period in which the control amount of the compensation current Ia is limited, that is, a phase for which the control amount of the compensation current Ia is limited. Thus, in the case of a phase for which the control amount of the compensation current Ia is not limited, the harmonic current compensator 15 cancels the harmonic component of the load current IL by using the compensation current Ia, whereas in the case of a phase for which the control amount of the compensation current Ia is limited, the harmonic current compensator 15 limits the load current IL by using the compensation current Ia. Thus, the harmonic current compensator 15 can avoid stopping of an operation of the harmonic generating load 13 due to an excess of the compensation current Ia over the overcurrent level while limiting the harmonic component of the load current IL to some degree.

In Embodiment 2, the prediction portion 63 may predict a phase at which the control amount of the compensation current Ia exceeds the preset value, based on a control amount of the compensation current Ia for one cycle of the system power supply 11.

With the configuration described above, the harmonic current compensator 15 predicts a phase at which the control amount of the compensation current Ia exceeds the preset value, based on a past control amount of the compensation current Ia, and thus, a future operating state can be improved based on a past operating state.

As described above, since the harmonic current compensator 15 limits the upper limit of the compensation current Ia, even when the instantaneous value of the load current IL greatly changes under the influence of the system power supply 11, the compensation current Ia does not instantaneously reach the overcurrent level and the harmonic current compensator 15 can particularly significantly continue an operation of the air-conditioning apparatus. As a result, the harmonic current compensator 15 can maintain the capacity of the air-conditioning apparatus.

Embodiment 3

Difference from Embodiments 1 and 2

A harmonic current compensator 15 according to Embodiment 3 limits a compensation output instruction from a compensation output instruction computing portion 43.

Configuration According to Embodiment 3

Figure 7:
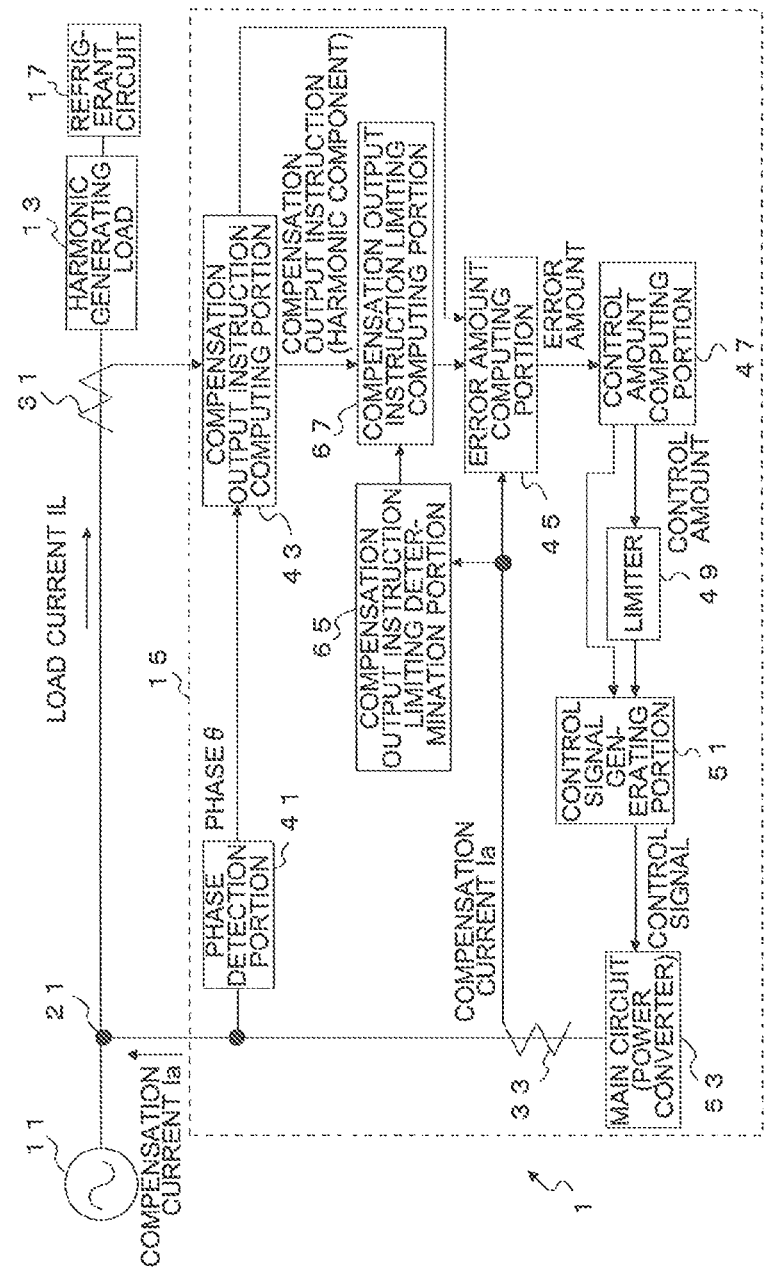
FIG. 7 schematically illustrates a configuration of an air-conditioning system 1 including a harmonic current compensator 15 according to Embodiment 3 of the present invention.

FIG. 7 schematically illustrates a configuration of an air-conditioning system 1 including the harmonic current compensator 15 according to Embodiment 3 of the present invention. As illustrated in FIG. 7, in addition to the configuration of Embodiment 1, the harmonic current compensator 15 additionally includes a compensation output instruction limiting determination portion 65 and a compensation output instruction limiting computing portion 67.

The compensation output instruction limiting determination portion 65 compares a compensation current Ia and a predetermined limiting determination value, and determines whether to limit the compensation output instruction or not. The limiting determination value is, for example, a current value, and is smaller than an overcurrent level. Specifically, if at least one of three phases of the compensation currents Ia reaches a predetermined limiting determination value, the compensation output instruction limiting determination portion 65 determines that the compensation current Ia can be excessively large, and causes the compensation output instruction limiting computing portion 67 to limit a compensation output instruction. The compensation output instruction limiting computing portion 67 limits an instruction value for a harmonic component of a load current IL.

The limiting determination value may be set while periodicity of the compensation current Ia being focused on. For example, in one cycle of a power supply voltage, the limiting determination value may be set based on a period including margins before and after a reference phase that is a timing or phase at which a previous or past compensation current Ia is larger than a preset value. The limiting determination value may be experimentally determined. The limiting determination value may dynamically change based on a value detected in the past for each control period.

Operation of Embodiment 3

Figure 8:
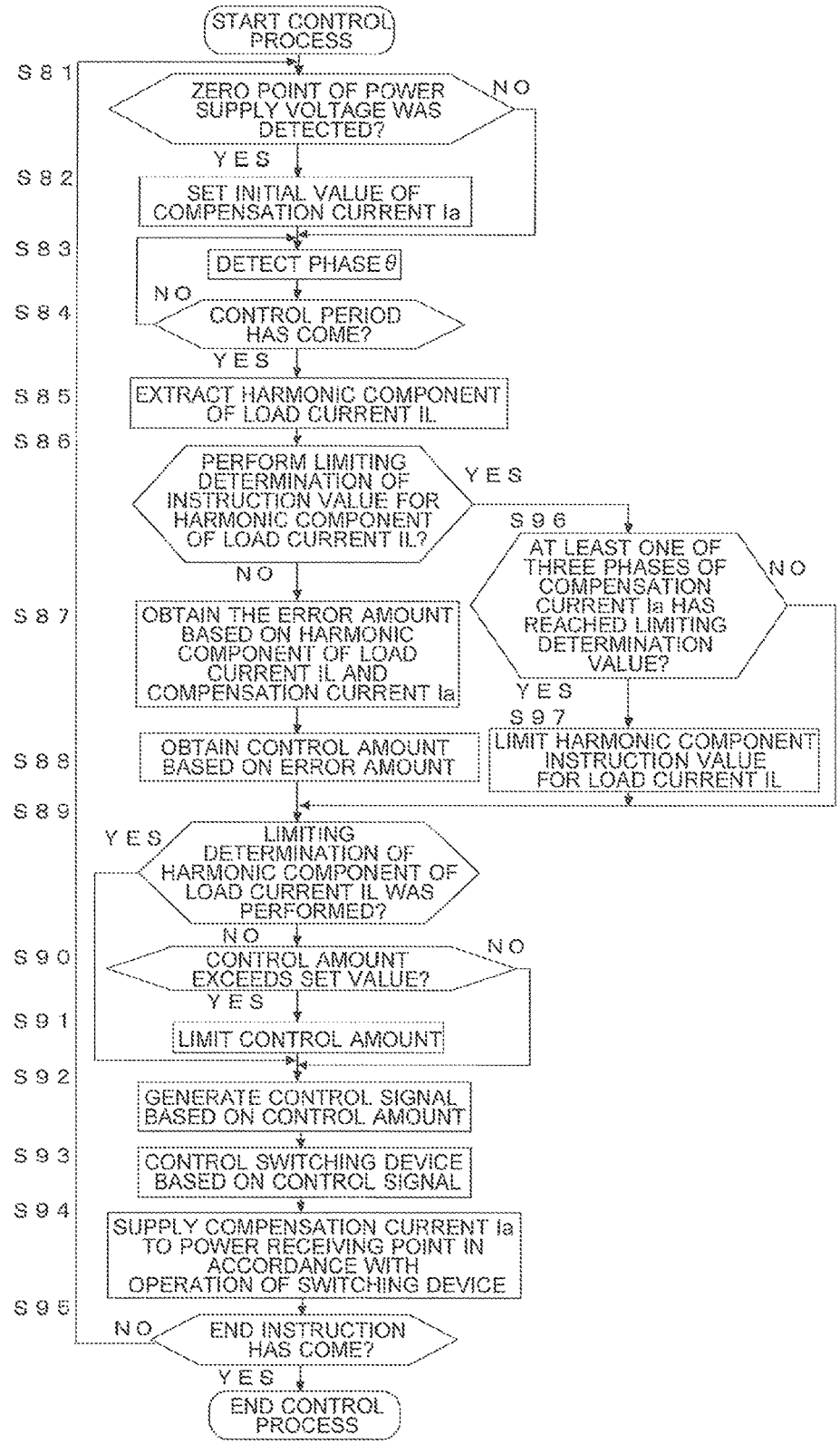
FIG. 8 is a flowchart of a control example of the harmonic current compensator 15 in Embodiment 3 of the present invention.

FIG. 8 is a flowchart of a control example of the harmonic current compensator 15 in Embodiment 3 of the present invention.

(Step S81)

The harmonic current compensator 15 determines whether a zero point of a power supply voltage was detected or not. If the zero point of the power supply voltage was detected, the harmonic current compensator 15 proceeds to step S82. If the zero point of the power supply voltage was not detected, the harmonic current compensator 15 proceeds to step S83.

(Step S82)

The harmonic current compensator 15 sets an initial value of the compensation current Ia.

(Step S83)

The harmonic current compensator 15 detects a phase θ.

(Step S84)

The harmonic current compensator 15 determines whether a control period has come or not. If the control period has come, the harmonic current compensator 15 proceeds to step S85. If the control period has not come, the harmonic current compensator 15 returns to step S83.

(Step S85)

The harmonic current compensator 15 extracts a harmonic component of the load current IL.

(Step S86)

The harmonic current compensator 15 determines whether to perform limiting determination of an instruction value for a harmonic component of the load current IL or not. If limiting determination of the instruction value for the harmonic component of the load current IL is performed, the harmonic current compensator 15 proceeds to step S96. If limiting determination of the instruction value for the harmonic component of the load current IL is not performed, the harmonic current compensator 15 proceeds to step S87.

(Step S87)

Based on the harmonic component of the load current IL and the compensation current Ia, the harmonic current compensator 15 obtains the error amount.

(Step S88)

Based on the error amount, the harmonic current compensator 15 obtains a control amount.

(Step S89)

The harmonic current compensator 15 determines whether limiting determination of the harmonic component of the load current IL has been performed or not. If the limiting determination of the harmonic component of the load current IL has been performed, the harmonic current compensator 15 proceeds to step S92. If the limiting determination of the harmonic component of the load current IL has not been performed, the harmonic current compensator 15 proceeds to step S90.

(Step S90)

The harmonic current compensator 15 determines whether the control amount exceeds a set value or not. If the control amount exceeds the set value, the harmonic current compensator 15 proceeds to step S91. If the control amount does not exceed the set value, the harmonic current compensator 15 proceeds to step S92.

(Step S91)

The harmonic current compensator 15 limits the control amount.

(Step S92)

Based on the control amount, the harmonic current compensator 15 generates a control signal.

(Step S93)

Based on the control signal, the harmonic current compensator 15 controls a switching device.

(Step S94)

In accordance with an operation of the switching device, the harmonic current compensator 15 supplies a compensation current Ia to the power receiving point 21.

(Step S95)

The harmonic current compensator 15 determines whether an end instruction has come or not. If the end instruction has come, the harmonic current compensator 15 finishes the process. If the end instruction has not come, the harmonic current compensator 15 returns to step S81.

(Step S96)

The harmonic current compensator 15 determines whether at least one phase of three phases of the compensation current Ia has reached the limiting determination value or not. If at least one phase of three phases of the compensation current Ia has reached the limiting determination value, the harmonic current compensator 15 proceeds to step S97. If none of three phases of the compensation current Ia has reached the limiting determination value, the harmonic current compensator 15 proceeds to step S89.

(Step S97)

The harmonic current compensator 15 limits an instruction value for the harmonic component of the load current IL.

Advantages of Embodiment 3

As described above, the harmonic current compensator 15 according to Embodiment 3 determines whether to limit the compensation current Ia or not based on a limiting determination value smaller than an overcurrent level. To limit the instruction value for the harmonic component of the load current IL, the harmonic current compensator 15 limits the instruction value for the harmonic component of the load current IL before the compensation current Ia reaches the overcurrent level. Thus, the harmonic current compensator 15 can limit the harmonic component of the load current IL, the compensation current Ia does not reach the overcurrent level, and an operation of the harmonic generating load 13 can continue.

In Embodiment 3, a compensation output instruction limiting computing portion 67 that limits an amplitude of a harmonic component contained in the load current IL may also be provided. In this case, if a limiting determination value for determining whether to limit the compensation current Ia or not is less than an overcurrent level for determining whether to stop an operation of the harmonic generating load 13, the system power supply 11 is a three-phase alternating current power supply, and at least one phase of phases of the compensation current Ia detected by a compensation current detector 33 has reached a predetermined set limiting determination value, the compensation output instruction limiting computing portion 67 may limit the instruction value for the harmonic component of the load current IL.

With the configuration described above, the harmonic current compensator 15 determines whether to limit the compensation current Ia or not based on the limiting determination value smaller than the overcurrent level. To limit the instruction value for the harmonic component of the load current IL, the harmonic current compensator 15 limits the instruction value for the harmonic component of the load current IL before the compensation current Ia reaches the overcurrent level. Thus, the harmonic current compensator 15 can limit the harmonic component of the load current IL, and the compensation current Ia does not reach the overcurrent level so that an operation of the harmonic generating load 13 can continue.

In Embodiment 3, the harmonic current compensator 15 may have a power supply period of the system power supply 11, and a control period for computing a control amount of the compensation current Ia included in the power supply period of the system power supply 11, and the limiting computing portion 67 may limit the instruction value for the harmonic component of the load current IL based on the compensation current Ia and the limiting determination value for each control period.

With this configuration, the harmonic current compensator 15 can repeatedly limit the instruction value for the harmonic component of the load current IL in one power supply period.

Accordingly, the harmonic current compensator 15 limits the upper limit of the compensation current Ia, and even when the instantaneous value of the load current IL greatly changes under the influence of the system power supply 11, the compensation current Ia does not instantaneously reach the overcurrent level and the harmonic current compensator 15 can particularly significantly continue an operation of the air-conditioning apparatus. As a result, the harmonic current compensator 15 can maintain the capacity of the air-conditioning apparatus.

Embodiment 4

Difference from Embodiments 1 to 3

A harmonic current compensator 15 according to Embodiment 4 is configured to desirably set a limiting determination value.

Configuration According to Embodiment 4

Figure 9:
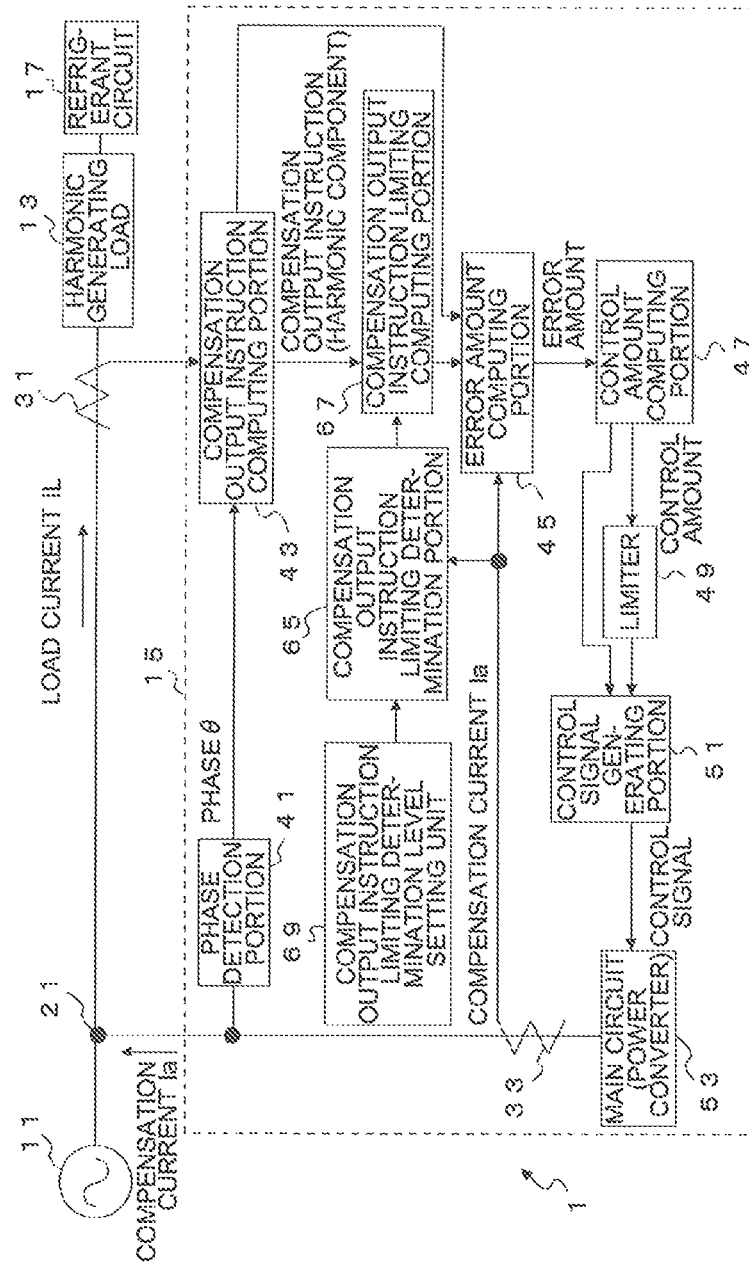
FIG. 9 schematically illustrates a configuration of an air-conditioning system 1 including a harmonic current compensator 15 according to Embodiment 4 of the present invention.

FIG. 9 schematically illustrates a configuration of an air-conditioning system 1 including the harmonic current compensator 15 according to Embodiment 4 of the present invention. As illustrated in FIG. 9, in addition to the configuration of Embodiment 3, the harmonic current compensator 15 according to Embodiment 4 additionally includes a compensation output instruction limiting determination level setting portion 69.

The compensation output instruction limiting determination level setting portion 69 desirably sets a limiting determination value. Such a limiting determination value is set in accordance with the degree of unbalance of interphase voltages of a system power supply 11 or a voltage distortion. As the degree of unbalance of the interphase voltage of the system power supply 11 or the voltage distortion increases, a control amount of a compensation current Ia increases. Accordingly, the possibility that the compensation current Ia reaches an overcurrent level increases.

In view of this, the harmonic current compensator 15 reduces a limiting determination value in advance and relatively greatly limits a compensation output instruction that is an output of a compensation output instruction computing portion 43 to, consequently, perform an operation of further reducing a peak value of the compensation current Ia. Since the compensation current Ia varies in accordance with the degree of influence of the system power supply 11, the limiting determination value may be set after installation of a product. A set initial value of the limiting determination value may be a minimum limiting determination value determined on the assumption of an ideal power supply voltage of the system power supply 11. The limiting determination value may be a value determined in consideration of average situations of a power supply voltage of the system power supply 11 based on past experiences. That is, the limiting determination value is not fixed at a value, and may be changeable in accordance with, for example, installation conditions.

Operation of Embodiment 4

Figure 10:
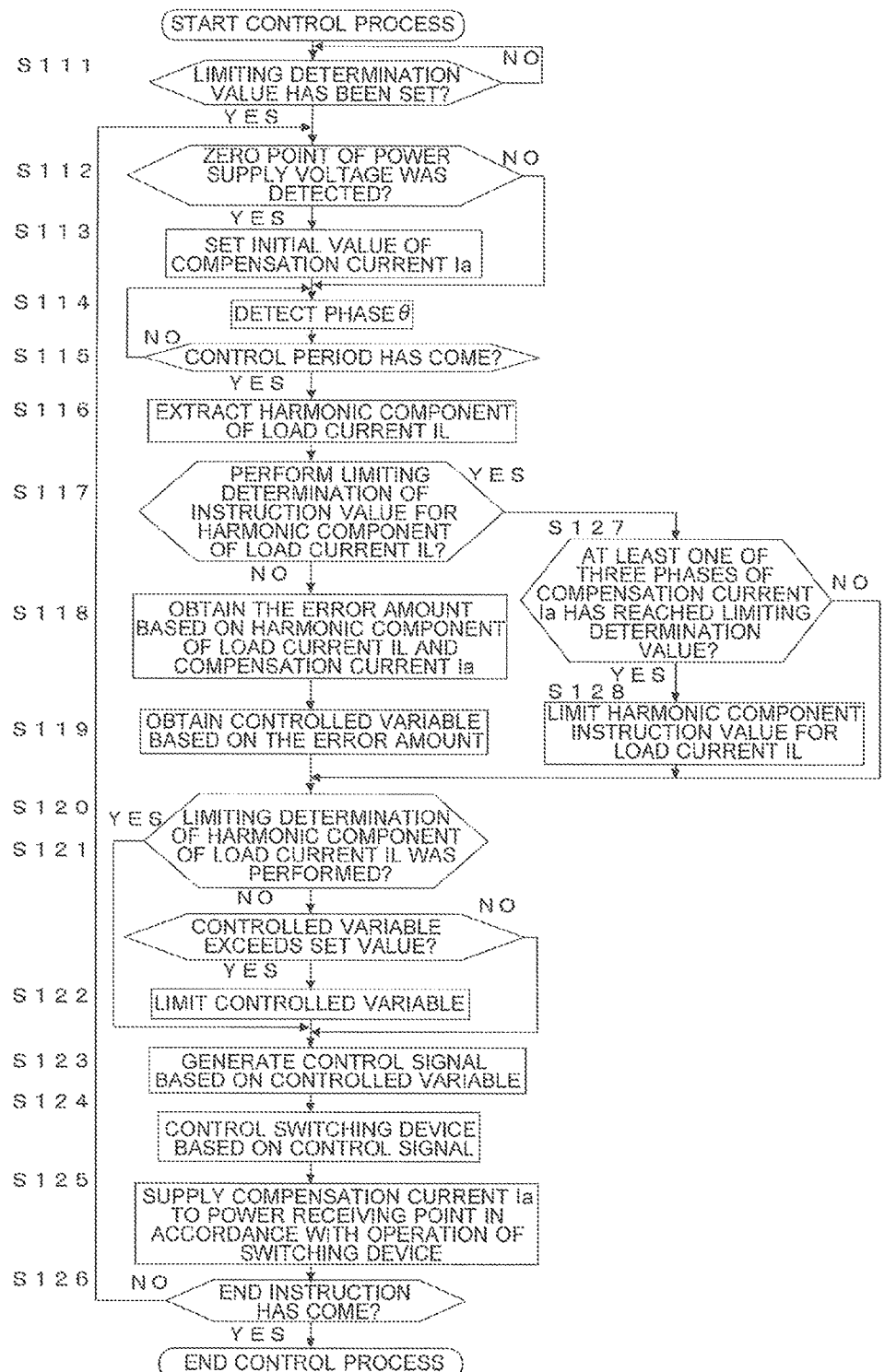
FIG. 10 is a flowchart of a control example of the harmonic current compensator 15 in Embodiment 4 of the present invention.

FIG. 10 is a flowchart of a control example of the harmonic current compensator 15 in Embodiment 4 of the present invention. Processes of steps S112 to S128 are similar to those in Embodiment 3, and will not be described again.

(Step S111)

The harmonic current compensator 15 determines whether the limiting determination value has been set or not. If the limiting determination value has been set, the harmonic current compensator 15 proceeds to step S112. If the limiting determination value has not been set, the harmonic current compensator 15 returns to step S111.

Advantages of Embodiment 4

As described above, the harmonic current compensator 15 according to Embodiment 4 can desirably set the limiting determination value, and thus, can set the limiting determination value depending on the influence of, for example, unbalance of the interphase voltage of the system power supply 11 or voltage distortions of the system power supply 11. Thus, the harmonic current compensator 15 can avoid excessive limiting of the compensation current Ia. In addition, since the harmonic current compensator 15 can desirably set the limiting determination value serving as a limiting trigger of the compensation current Ia, insufficient limiting of the compensation current Ia can be reduced.

As described above, in Embodiment 4, the harmonic current compensator 15 may further include a limiting determination level setting portion 69 that sets the limiting determination value, and a compensation output instruction limiting computing portion 67 may limit the instruction value for the harmonic component of the load current IL based on the limiting determination value set by the limiting determination level setting portion 69.

With this configuration, the harmonic current compensator 15 can desirably set the limiting determination value, and thus can set the limiting determination value depending on the influence of, for example, unbalance of the interphase voltages of the system power supply 11 or a voltage distortion of the system power supply 11. Thus, the harmonic current compensator 15 can avoid excessive limiting of the compensation current Ia. In addition, since the harmonic current compensator 15 can desirably set the limiting determination value serving as a limiting trigger of the compensation current Ia, insufficient limiting of the compensation current Ia can be reduced.

Accordingly, the harmonic current compensator 15 limits the upper limit of the compensation current Ia, and even when the instantaneous value of the load current IL greatly changes under the influence of the system power supply 11, the compensation current Ia does not instantaneously reach the overcurrent level and the harmonic current compensator 15 can particularly significantly continue an operation of the air-conditioning apparatus. As a result, the harmonic current compensator 15 can maintain the capacity of the air-conditioning apparatus.

As a common assumption of Embodiments 1 to 4, a rectifying circuit including a reactor is provided as a power converter. In such an assumption, the harmonic current compensator 15 is particularly effective in a case where an abrupt change of output of the power converter is relatively small and the load current IL in substantially the same amount repeatedly flows in the power converter and the power converter supplies electric power to the air-conditioning apparatus.

REFERENCE SIGNS LIST 1 air-conditioning system, 11 system power supply, 13 harmonic generating load, 15 harmonic current compensator, 17 refrigerant circuit, 21 power receiving point, 31 load current detector, 33 compensation current detector, 41 phase detection portion, 43 compensation output instruction computing portion, 45 error amount computing portion, 47 control amount computing portion, 49 limiter, 51 control signal generating portion, 53 main circuit, 61 storage portion, 63 prediction portion, 65 compensation output instruction limiting determination portion, 67 compensation output instruction limiting computing portion, 69 compensation output instruction limiting determination level setting portion.

The invention claimed is:

1. A harmonic current compensator connected in parallel with a load to a system power supply and configured to supply a compensation current to limit a harmonic component contained in a load current to be input from the system power supply to the load, the harmonic current compensator comprising:
    a load current detection portion configured to detect the load current;
    a compensation current detection portion configured to detect the compensation current;
    a control amount computing portion configured to compute a control amount of the compensation current based on the harmonic component contained in the load current detected by the load current detection portion and the compensation current detected by the compensation current detection portion; and
    a limiter configured to, when the control amount computed by the control amount computing portion exceeds a preset value, limit the control amount, wherein
    the limiter is configured to limit the control amount computed by the control amount computing portion to less than or equal to the preset value,
    the preset value is such a value that a value of the compensation current based on the control signal generated by the control amount limited to the preset value does not exceed an overcurrent level of the compensation current.

2. The harmonic current compensator of claim 1, further comprising:
    a storage portion configured to store the compensation current and a phase corresponding to the compensation current; and
    a prediction portion configured to predict a phase at which the compensation current exceeds a preset value, based on the compensation current stored in the storage portion, wherein
    the limiter is configured to limit the control amount of the compensation current corresponding to a phase in a range set in advance with reference to the phase predicted by the prediction portion.

3. The harmonic current compensator of claim 2, wherein the prediction portion is configured to predict a phase at which the control amount of the compensation current exceeds the preset value, based on a control amount of the compensation current for one cycle of the system power supply.

4. The harmonic current compensator of claim 1, further comprising a limiting computing portion configured to limit an amplitude of the harmonic component contained in the load current, wherein
    a limiting determination value for determining whether to limit the compensation current or not is at a value less than a current threshold for determining whether to stop an operation of the load or not,
    the system power supply is a three-phase alternating current power supply, and
    the limiting computing portion is configured to limit an instruction value for the harmonic component of the load current in a case where the compensation current of at least one phase in the compensation current detected by the compensation current detection portion reaches the limiting determination value.

5. The harmonic current compensator of claim 4, wherein the system power supply is configured to supply electric power for each power supply period, the power supply period including a control period for computing a control amount of the compensation current, wherein
    the limiting computing portion is configured to limit the instruction value for the harmonic component of the load current based on the compensation current and the limiting determination value for each control period.

6. The harmonic current compensator of claim 4, further comprising a limiting determination level setting portion configured to set the limiting determination value, wherein
    the limiting computing portion is configured to limit the instruction value for the harmonic component of the load current based on the limiting determination value set by the limiting determination level setting portion.

7. An air-conditioning system comprising:
    the harmonic current compensator of claim 1;
    the system power supply; and
    a refrigerant circuit that is connected to the system power supply and is driven by a current supplied from the system power supply.

* * * * *